United States Patent [19]

Maloney

[11] Patent Number: 5,239,796

[45] Date of Patent: Aug. 31, 1993

[54] STAIRCASE CABINET

[76] Inventor: Timothy J. Maloney, 215 High St., Strasburg, Va. 22657

[21] Appl. No.: 669,448

[22] Filed: Mar. 13, 1991

[51] Int. Cl.⁵ .......................................... E04F 19/10
[52] U.S. Cl. ........................................ 52/188; 52/191; 182/216; 182/223; 403/255; 403/348
[58] Field of Search .............. 52/182, 188, 191, 127.7, 52/710, 183; 182/93, 216, 223, 228, 220; 403/254, 255, 348, 349

[56] References Cited

U.S. PATENT DOCUMENTS

| | | | |
|---|---|---|---|
| 71,049 | 11/1967 | Page | 52/182 |
| 106,671 | 8/1970 | Liesche | 182/33.2 |
| 310,149 | 12/1984 | Protzman | 312/235.2 |
| 487,117 | 11/1982 | Farner | 312/315 |
| 927,671 | 7/1909 | Nicholson | 312/278 |
| 1,481,396 | 1/1924 | Ternes | 248/680 |
| 1,635,183 | 7/1927 | Jeannotte | 182/33 |
| 2,479,736 | 8/1949 | Fieroh | 182/17 |
| 2,555,002 | 5/1951 | Phillips et al. | 52/188 |
| 3,030,166 | 4/1962 | Richards et al. | 182/96 X |
| 3,090,086 | 5/1963 | Fata | 403/381 |
| 3,580,620 | 5/1971 | Offenbroich | 287/54 |
| 3,593,469 | 7/1971 | Wall | 32/27 |
| 3,986,780 | 10/1976 | Nivet | 403/353 |
| 3,995,923 | 12/1976 | Shell | 312/311 |
| 4,035,097 | 7/1977 | Bachand | 403/348 |
| 4,131,376 | 12/1978 | Busse | 403/12 |
| 4,139,077 | 2/1979 | Pena, Jr. | 182/35 |
| 4,199,040 | 4/1980 | Lapeyre | 182/93 |
| 4,205,761 | 9/1965 | Ramsay | 85/83 |
| 4,294,355 | 2/1981 | Anderson et al. | 52/593 |
| 4,367,613 | 1/1983 | Strub | 52/191 X |
| 4,464,870 | 8/1984 | Crepeau | 52/188 |
| 4,564,732 | 1/1986 | Lancaster et al. | 200/387 |
| 4,627,200 | 12/1986 | Lapeyre | 52/191 |
| 4,641,983 | 2/1987 | Strassle | 403/12 |
| 4,784,552 | 11/1988 | Rebentisch | 41/85 |
| 4,784,554 | 11/1988 | Break | 411/383 |
| 4,830,531 | 5/1989 | Condit et al. | 403/348 |
| 4,840,525 | 6/1989 | Rebentisch | 411/85 |
| 4,867,598 | 9/1989 | Winter, IV | 403/381 |

Primary Examiner—Richard E. Chilcot, Jr.
Assistant Examiner—Kien Nguyen

[57] ABSTRACT

A staircase cabinet comprises a plurality of treads each having an outer edge, an inner edge and a back surface; a pair of outer stringers both for defining opposed walls of the cabinet and supporting the outer edges of each tread; an inner stringer for supporting the inner edges of each tread; and fasteners for attaching the treads to the inner stringer and the outer stringers in alternating arrangement on respective opposite sides of the inner stringer to define an alternating staircase for use between a lower level and an upper level, the back surface of the treads and the outer stringers defining a cabinet space. The outer stringers comprise planar wooden sheets having an outer surface, and the fasteners pass only partially through the planar members to maintain the outer surface unbroken by the fasteners.

24 Claims, 7 Drawing Sheets

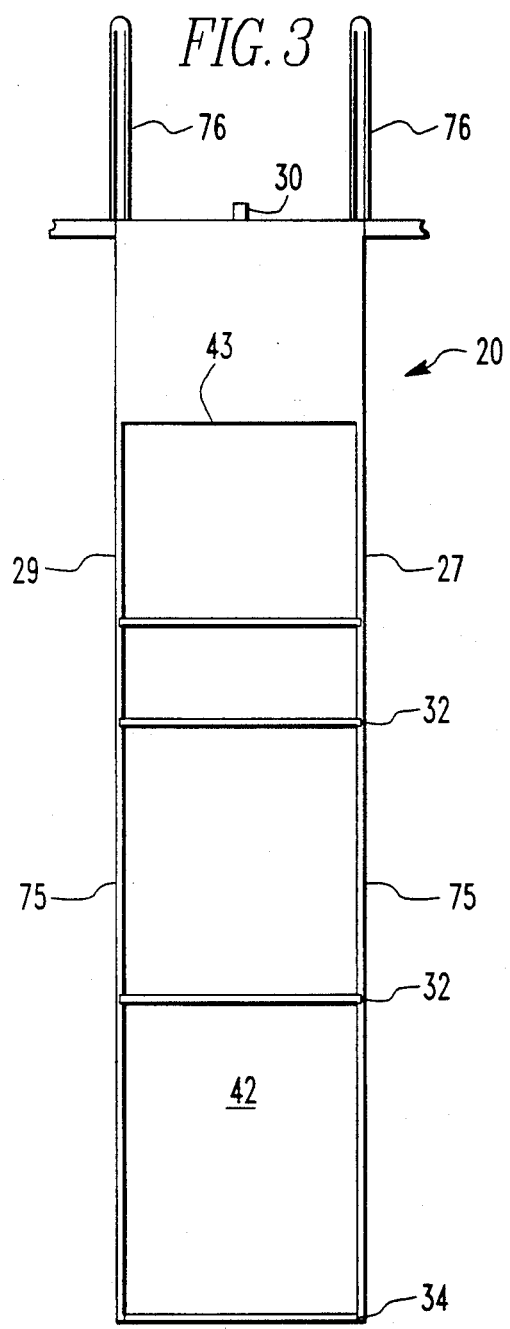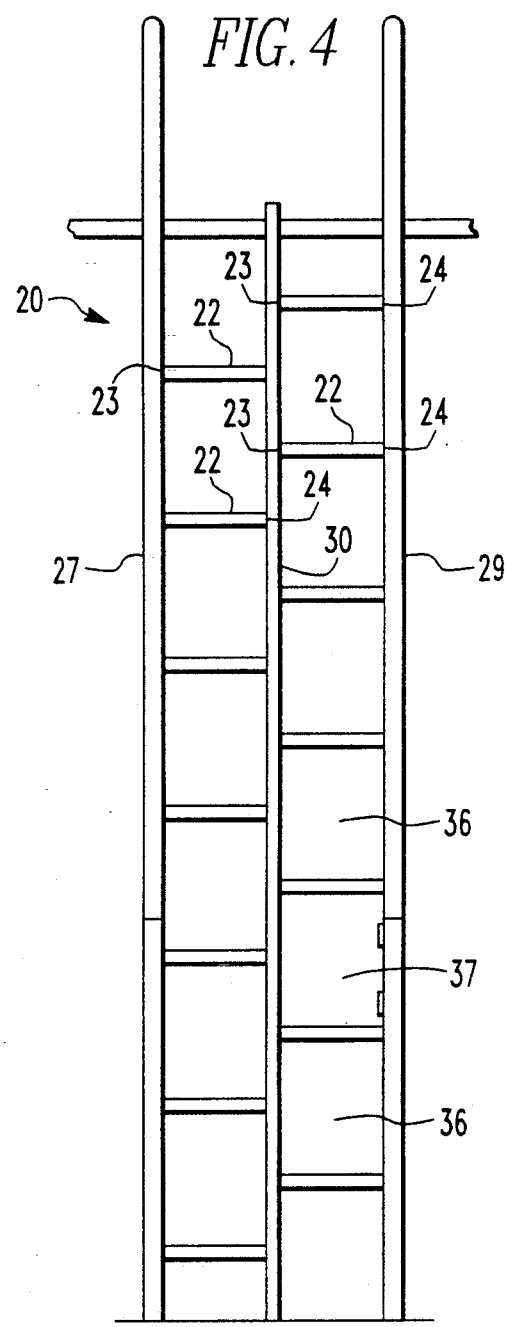

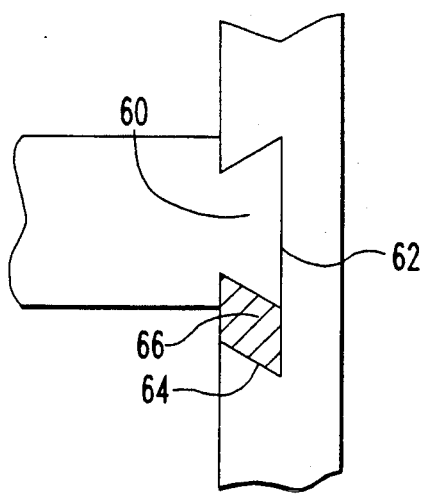
FIG. 15
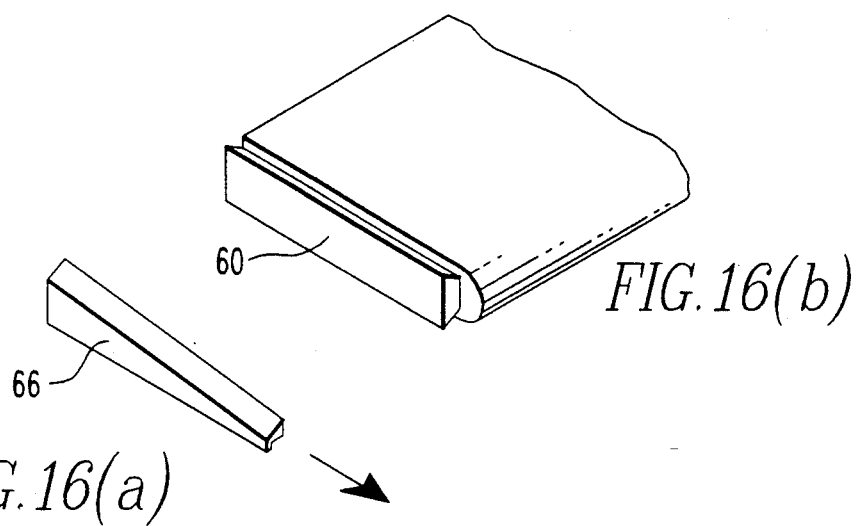
FIG. 16(a)
FIG. 16(b)
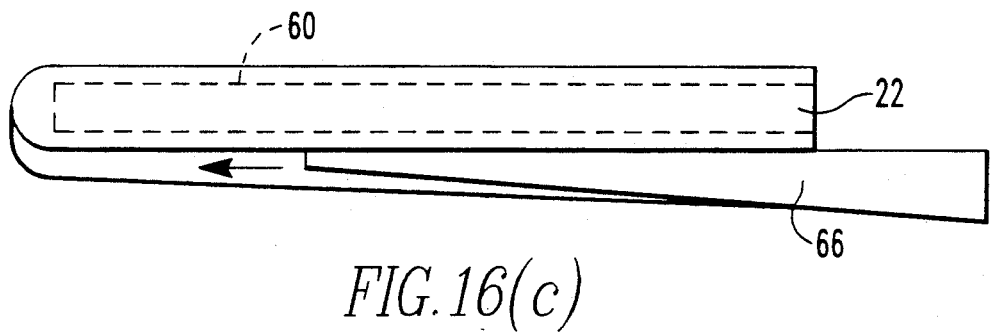
FIG. 16(c)

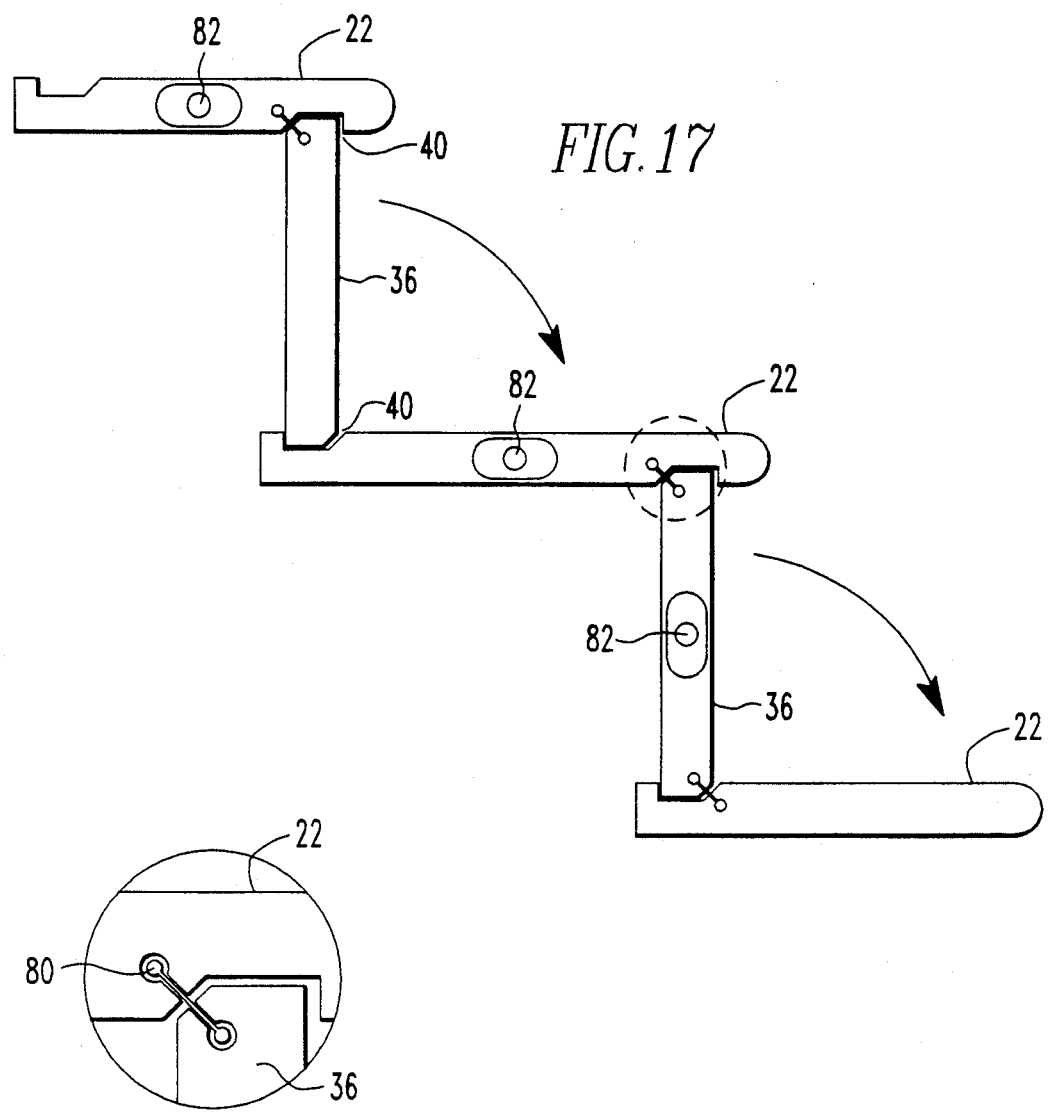
FIG. 17
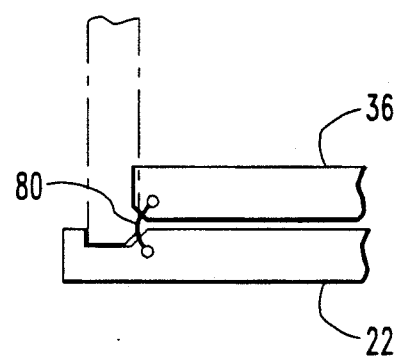
FIG. 18
FIG. 19

STAIRCASE CABINET

BACKGROUND OF THE INVENTION

1. Field of the Invention

This invention relates to furniture, and more particularly to furniture which serves multiple functions and may be readily assembled or disassembled. Specifically, the invention relates to a combination staircase and cabinet which meets most building code requirements and occupies a very small space in a home.

2. Description of the Related Art

Furniture which combines the functions of a staircase with some storage capability has been disclosed in the prior art. For example, U.S. Pat. No. 310,149 describes a combined seat, drawer, step and shelving for stores; U.S. Pat. No. 487,117 describes a step for shelves; U.S. Pat. No. 1,635,183 discloses a combined stool, steps and tool box; and U.S. Pat. No. 2,479,736 discloses a stair stand. Similarly, a combination cabinet and step ladder is disclosed in Pat. No. 3,030,166, and a device entitled, "Ladder Furniture," is described in U.S. Pat. No. 4,139,077. All of these patents involve attempts at solving a problem of providing furniture which serves more than one function in order to reduce wasted space in a household. However, none of these patents discloses or suggests a structure which may practically be used as a staircase in a typical home or building as a replacement for a traditional staircase and also serve as a cabinet. Staircases occupy an excessive amount of space in a building, and this creates a particular problem when floor space is limited.

One type of stairs which has been used to reduce the required space is so called "alternating step" staircase. In general, this type of staircase can be constructed to meet typical building code requirements while occupying a smaller space than conventional stairs. With the increasing use of modular or prefabricated construction, there is also a need for the ability to easily ship and assemble such stairs. An example of such a stair case is disclosed in U.S. Pat. No. 4,627,200.

Particularly in the design of very small homes, or so called "mini homes," the need to reduce wasted space is critical. In such homes, it is important to utilize every possible space in the most efficient manner.

Accordingly, it is an object of the present invention to efficiently utilize the space required for a staircase by employing a compact construction and combining the staircase function with that of a cabinet.

It is a further object of the present to provide a staircase cabinet which can be rapidly assembled and disassembled, can be readily shipped, and meets general building code requirements.

It is an additional object of the present invention to provide a combination staircase and cabinet which has a minimum number of parts and can be easily constructed.

Additional objects and advantages of the invention will be apparent from the description which follows, or may be learned by practice of the invention.

SUMMARY OF THE INVENTION

To achieve the foregoing objects and advantages, and in accordance with the purposes of the invention as embodied and broadly described herein, the staircase cabinet of the present invention comprises a plurality of treads, each having an outer edge, an inner edge and a back surface. Outer stringer means are provided both for defining opposed walls of the cabinet and supporting the outer edges of each tread. An inner stringer supports the inner edges of each tread. Fastening means attach the treads to the inner stringer and the outer stringer means in alternating arrangement on respective opposite sides of the inner stringer to define an alternating staircase for use between a lower level and an upper level. The back surface of the treads and the outer stringer means define a cabinet space.

It is preferred that the outer stringer means include a pair of opposed planar members, the inner stringer being disposed at a predetermined angle of inclination between the planar members. It is also preferred that the planar members and the inner stringer each include mortise means defining a channel for supporting the tread, at least one of the treads include tenon means for insertion into the channel, and the fastening means include bolt means for securing the tenon means in the channel. In addition, the bolt means may include a bolt having a rectangular shaped head, and the mortise may include keyway means in each of the planar members and the inner stringer for rotatably receiving the rectangular shaped head therein.

It is preferred that the outer walls of the cabinet be substantially parallel to each other and the cabinet may include a shelf removable fixed between the planar members for strengthening the cabinet, and the cabinet may include a tensile rail between the planar members for increasing the rigidity of the cabinet. A plurality of risers are preferably provided between the inner stringer and the planar members. The risers are positioned at least between adjacent pairs of treads on the same side of the inner stringer and means are provided for attaching the risers between the inner stringer and the planar members in alternating arrangement on respective opposite sides of the inner stringer. The means for attaching preferably includes means for permitting movement of one of the risers to allow access to the cabinet space behind the riser.

It is preferred that each of the planar member simultaneously serve as an outside stringer, rail support and wall of the cabinet, and the planar members are preferably integrally formed of a single plywood sheet. Alternatively, more than one sheet of plywood may be used, with male/female type joints for field joining the sheets to form each planar member.

For fastening the treads to the plywood, it is preferred that the rectangular head of the bolt include a beveled inner side and that the tenon means include a shoulder area. The inner side compresses the plywood between the head and the shoulder area to avoid splitting of the plywood when the head is rotated into the keyway means. The keyway means may include a plurality of slots in each of the planar members and the inner stringer. Each slot receives one of the heads when the corresponding bolt is rotated approximately 90° with respect to the tenon means. An access channel may be provided in each tread corresponding to each bolt in order to rotate the bolts.

A method of assembling a staircase cabinet is also disclosed.

BRIEF DESCRIPTION OF THE DRAWINGS

The accompanying drawings, which are incorporated in and constitute a part of the specification, illustrate the presently preferred embodiments of the invention and, together with the description, serve to explain the principles of the invention.

FIG. 3 is a partially cutaway rear view of the staircase cabinet of the invention;

FIG. 4 is a front view of the staircase cabinet of the invention showing the alternating steps;

FIG. 15 is an end view similar to FIG. 13 showing the wedge in place;

FIG. 16a is a perspective view of the wedge, FIG. 16b is a perspective view of the tread of FIG. 11, and FIG. 16c is a view similar to that of FIG. 11 showing the wedge placement;

FIG. 17 is a side view of a group of treads and risers utilizing the flexible joint;

FIG. 18 is a partially exploded view of the flexible joint connecting the treads and risers; and FIG. 19 is a side view of one tread and riser in the position folded for shipping.

DESCRIPTION OF THE PREFERRED EMBODIMENT

Reference will now be made in detail to the present preferred embodiments of the invention, as illustrated in the accompanying drawings.

The present invention is a combination staircase and cabinet. In accordance with the invention, the staircase cabinet comprises a plurality of treads, each having an outer edge, an inner edge and a back surface; outer stringer means both for defining opposed walls of the cabinet and supporting the outer edges of each tread; an inner stringer for supporting the inner edges of each tread; and fastening means for attaching the treads to the inner stringer and the outer stringer means in alternating arrangement on respective opposite sides of the inner stringer to define an alternating staircase for use between a lower level and an upper level, the back surface of the treads and the outer stringer defining a cabinet space.

Figure 1:
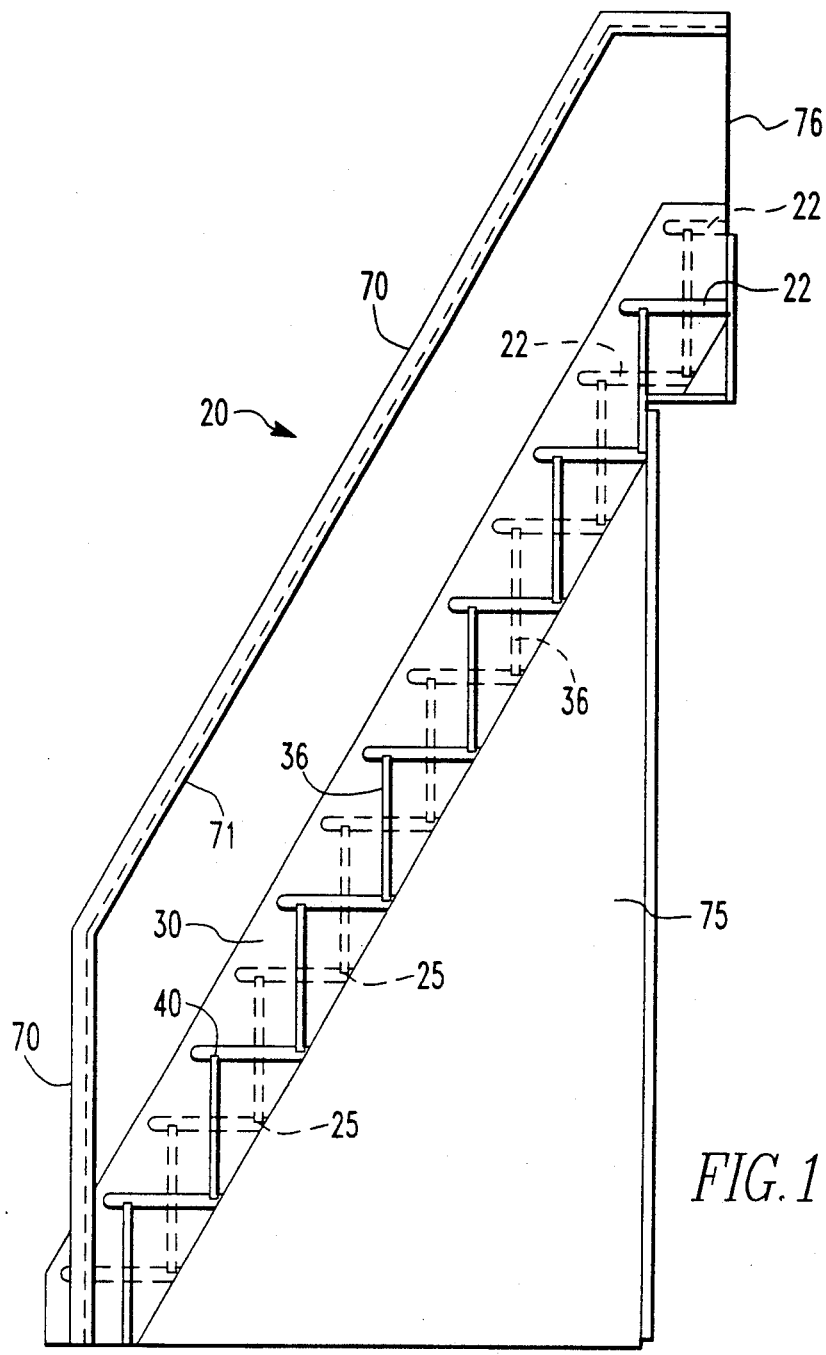
FIG. 1 is a side view of the staircase cabinet of the present invention.
Figure 2:
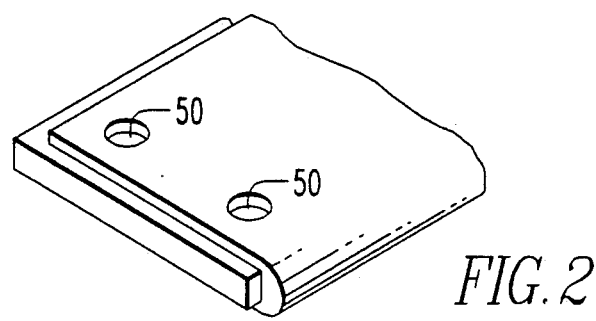
FIG. 2 is a perspective view of the bottom surface of one end of one of the treads.

As shown in FIGS. 1 and 2, the cabinet, generally designated by the numeral 20, includes a plurality of treads 22. Each of the treads 22 has an outer edge 23, and inner edge 24 and a back surface 25. In the illustrated embodiment, the outer stringer means includes a pair of planar members 27 and 29 which serve as the walls of the cabinet and as the supports for the outer edges 23 of each tread 22. An inner stringer 30 supports the inner edges 24 of each tread, and is disposed at a predetermined angle of inclination between the planar members 27 and 29. The planar members 27 and 29 are preferably formed of plywood sheets, and it is most desirable if a single plywood sheet, or a small number of sheets designed to be field-joined are used for the planar members. As illustrated in FIGS. 3 and 4, one end of the cabinet functions as the alternating staircase (FIG. 4), and the other end of the cabinet serves as a storage area or cabinet space 42 which may be covered by doors 43 or other appropriate closure means (FIG. 3). A shelf 32 may be mounted removably between the planar members 27 and 29 to provide additional strength to the cabinet. Additional shelves 32 may also be used. Further, a tensile rail 34 may be mounted between the lower back corners of the planar members 27 and 29 in order to provide increased rigidity to the cabinet.

As best shown in FIGS. 1 and 4, a plurality of risers 36 are typically positioned between adjacent pairs of treads 22 on the same side of the inner stringer 30. Typically, the risers 36 are attached by means of a groove 40 in the bottom surface of the tread 22 and the backside 25 of the tread 22. Each of the risers 36 may be sized to fit into these grooves or notches 40. Alternatively, the risers 36 may be attached to the planar members 27 and 29 and the inner stringer 30 utilizing fastening means to be described below.

One or more of the risers may be moveable and/or removeable in order to allow access to the cabinet space 42 from the staircase side of the cabinet. This may be particularly useful where mechanical equipment is stored in the cabinet space 42. An example of a removeable riser is shown at reference numeral 37 and FIG. 4, where the moveable riser 37 is hinged. Alternatively, the groove 40 on the upper tread may be made deeper than the groove 40 on the lower tread to allow removal of the riser 37.

In order to preserve the outer appearance of the cabinet, it is preferred that each of the planar members 27 and 29 comprise a wooden sheet having a smooth outer surface. In accordance with the invention, the fastening means passes only partially through the planar members 27 and 29 to maintain the outer surface unbroken by the fastening means. In order to achieve this result, a novel fastening means is employed in this invention, as shown in FIGS. 2 and 5-16. In accordance with the invention, the inner stringer and each of the planar members include mortise means defining a channel for supporting the tread. The treads include tenon means for insertion into the channel, and the fastening means includes bolt means for securing the tenon means in the channel. In this particular embodiment, the tenon means includes a shoulder area 44, and the mortise means comprises a mortise 45 cut into the interior of the planar members 27 and 29 and the inner stringer 30. A bolt 46 having a rectangular head 47 secures the shoulder area 44 in the mortise 45.

In accordance with the invention, keyway means in each of the planar members and the inner stringer rotatably receive the rectangular head therein. In the illustrated embodiment, the keyway means includes a slot 49 which receives the rectangular head 47 when the bolt 46 is rotated approximately 90° with respect to the tread 22.

Figure 5:
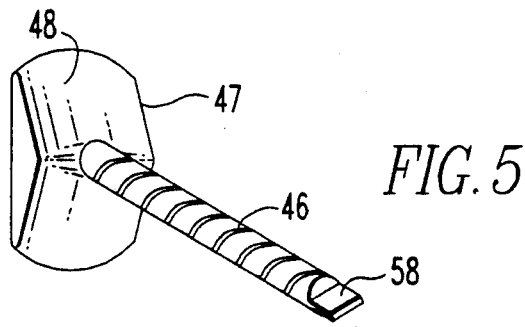
FIG. 5 is a perspective view of a bolt used in one embodiment of the fastening means of the invention.
Figure 6:
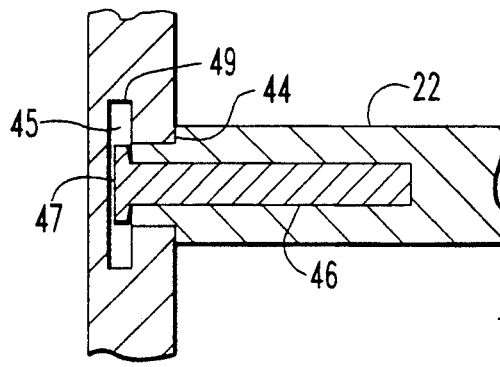
FIG. 6 is a schematic cross-sectional view of the fastening means at one end of one tread of the invention prior to locking the bolt in position.
Figure 7:
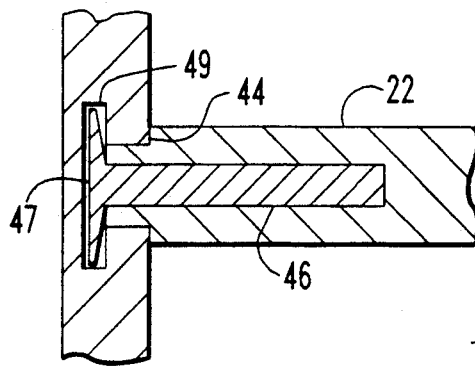
FIG. 7 is a view similar to FIG. 6 showing the bolt after being locked into position.

Each of the treads may include an access channel 50 on the bottom surface thereof corresponding to the position of each bolt 46 for rotating the bolts 46. As shown in FIG. 5, the inner Side 48 of the rectangular head 47 may be beveled so that it compresses the plywood of the planar members 27 and 29 between the head 47 and the shoulder area 44 when the head 46 is rotated in the slot 49 to avoid splitting of the plywood. The inner side may also include locking means for securing the bolt in the keyway means. For example, veins or barbs may be provided on the bolt head surface to grip against the wood of the planar members.

Figure 8:
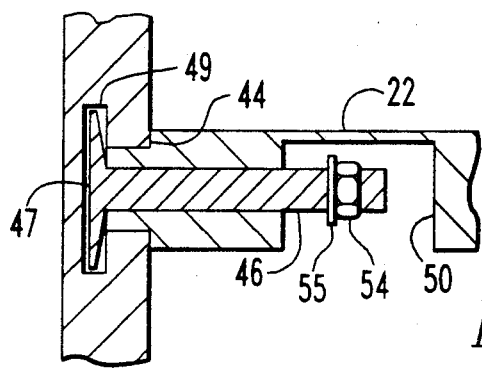
FIG. 8 is a cross-sectional schematic view of the fastening means using a different type of bolt in combination with a nut and washer.
Figure 9:
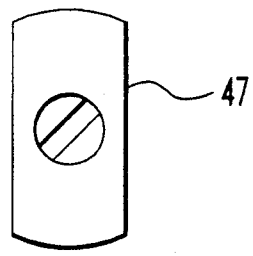
FIG. 9 is an end view of the rectangular shaped head of the bolt.
Figure 10:
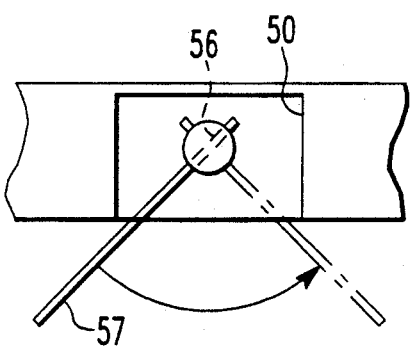
FIG. 10 is a view of the other end of the bolt showing the use of a tool to rotate the bolt into its locking position.
Figure 11:
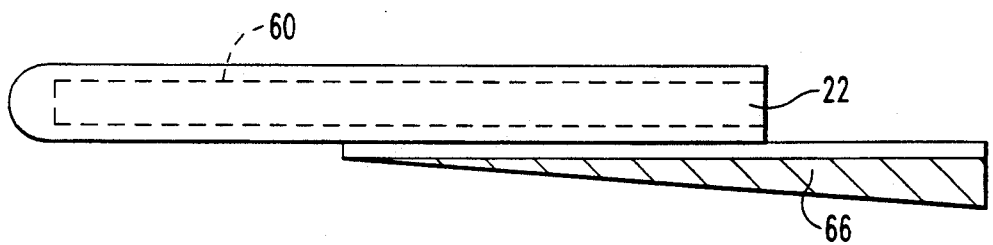
FIG. 11 is a cross-sectional view of a tread having a dovetail fastening means thereon in combination with a wedge.

An alternative bolt configuration is shown in FIG. 8. In that embodiment, a machine bolt 46 is utilized in conjunction with a nut 54 and a washer 55. As shown in FIGS. 9 and 10, the bolt 46 is arranged so that the rectangular head 47 may be rotated by means of a hole 56 in one end thereof, and a tool 57. Alternatively, as shown in FIG. 5, the bolt may include a cutaway portion 58 which may be engaged with a suitable tool (not shown). In the embodiment shown in FIG. 5, the pitch of the inner thickness 47 of the bolt 46 may be made greater than the pitch of the threads of the bolt 46. Thus, regardless of which direction the bolt is rotated after its insertion into the slot 49, a pinching force will be exerted between the head and the planar members 27 and 29. This can be helpful in insuring proper assembly of the cabinet in the field by untrained personnel.

Figure 12:
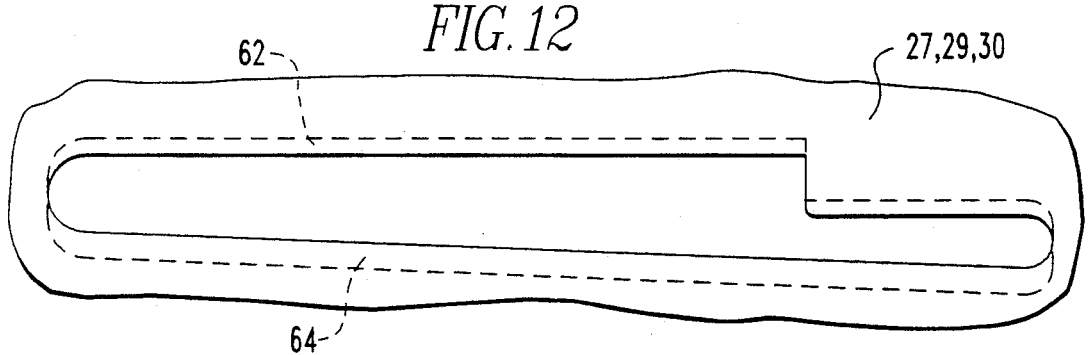
FIG. 12 is a cross-sectional view of the dovetail mortise in the planar member for receiving the tread therein.
Figure 13:
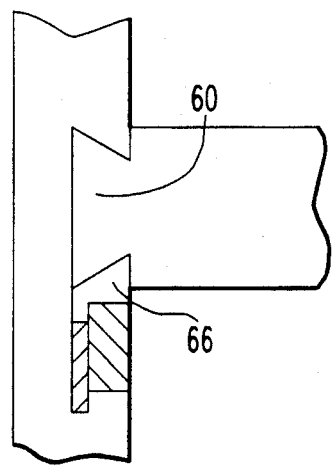
FIG. 13 is cross-sectional view of the tread of FIG. 11 mounted in the mortise of FIG. 12 with the wedge in place.
Figure 14:
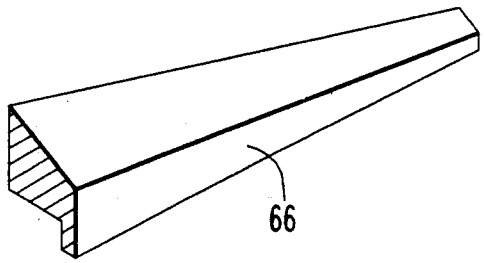
FIG. 14 is a perspective view of the wedge used in FIGS. 11 and 13.

As an alternative to the bolt-type fasteners, described above, a dovetail arrangement may be utilized as shown in FIGS. 11-16. In this fastening means, a male dovetail 60 is arranged on the end of each tread 22. This dovetail is a conventional one having upper and lower triangular protrusions, as shown in FIGS. 13 and 16*b*. The planar members 27 and 29 and the inner stringer 30 each include a plurality of truncated half female dovetails 62, each for receiving one of the male dovetails 60 therein. Each female dovetail 62 has a lower portion which is longer than the corresponding male dovetail 60, and the lower portion has a sloping lower side 64, as best shown in FIGS. 12 and 15. A wedge member 66 is sized for insertion into the female dovetail 62 along the sloping side 64 for securing the male dovetail 60 in the female dovetail 62. This dovetail arrangement allows for a secure connection between each tread and its supporting planar members 27, 29 and inner stringer 30. However, it is not necessary to weaken the planar members 27 and 29 or the inner stringer 30 by requiring a female dovetail to extend over an inordinate distance.

As is evident from the above, the cabinet of the present invention may be rapidly and easily assembled or disassembled. In addition, where the planar members 27 and 29 are formed of multiple sheets of plywood, the sheets are preferably provided with male/female type joints for facilitating field joining of the sheets to form each of the planar members. With the cabinet of the present invention, the planar members simultaneously serve as outside stringers, rail supports and walls of the cabinet. In addition, as shown in FIG. 1, separate rail caps 70 may be easily mounted onto the edges of the planar members 27 and 29. This can be accomplished by placing a groove 71 on one side of the rail cap 70 and fitting the groove 71 over the edge of the planar members 27 and 29. The rail cap 70 serves as a handrail and also stiffens the planar member 27, 29.

As shown in FIG. 1, the planar members include a lower portion 75 which defines the cabinet space 42 therebetween. An upper extended portion 76 defines an upper staircase area therebetween, and extends beyond the horizontal dimension of the lower portion 75 of the planar members 27 and 29. This reduces the space occupied by the cabinet particularly at the lower portion 75. The upper extended portion 76 supports the handrail and facilitates joining the staircase portion to the upper level of the structure.

In order to further facilitate the rapid assembly and disassembly of the cabinet and its ready transportability, flexible joint means may be provided for foldably attaching the risers to the treads in an accordion-like manner for facilitating shipment and assembly of the cabinet. The flexible joint means may include at least one flexible fastener between each successive tread and riser on each side of the inner stringer.

As illustrated in FIG. 17, a series of successive treads 22 and risers 36 are shown. The grooves 40 provided for receiving the risers 36 are shaped to allow movement of the risers with respect to the treads 22. As shown in FIGS. 18 and 19, a flexible fastener 80 is provided between each successive tread 22 and riser 36 to allow the tread and riser to be folded on one another. In this embodiment, the fastening means may comprise bolts 82 and mortise and tenon type joints, similar to those described previously. These flexible fasteners 80 allow much more rapid deployment of the tread and riser portions of the staircase cabinet.

The structure of the present invention, which is compact and has few parts, allows for simple construction, shipment and installation. In addition, the cabinet is designed to meet all generally acceptable building code requirements while maintaining a very small footprint of space at its base. For example, the handrail typically must extend not less than 34 inches above the nose of the tread. The tread may have not less than 10¼ inches exposed and not more than 2 inches of the tread above may overlap the tread. The rise from the top of one tread to the top of the next tread must be not more than 8 inches in height. The width between the handrails may not be less than 17 inches or more than 24 inches. All of these requirements may be readily met with the structure of the present invention. Accordingly, the staircase cabinet may be used in conventional homes and buildings without significant problem and may be easily assembled even by a consumer.

Additional advantages and modifications will readily occur to those skilled in the art. The invention in its broader aspects is therefore not limited to the specific details, representative apparatus and illustrative examples shown and described. Accordingly departures may be made from such details without departing from the spirit or scope of the general inventive concept defined by the appended claims and their equivalents.

What is claimed is:

1. A staircase cabinet, comprising:
   a plurality of treads, each having an outer edge, an inner edge and a back surface;
   outer stringer means both for defining opposed walls of the cabinet and supporting the outer edges of each tread;
   an inner stringer for supporting the inner edges of each tread; and fastening means for attaching the treads to the inner stringer and the outer stringer means in alternating arrangement on respective opposite sides of the inner stringer to define an alternating staircase of use between a lower level and an upper level, the back surface of the treads and the outer stringer means defining a cabinet space;

the outer stringer means including a pair of opposed planar members, the inner stringer being disposed at a predetermine angle of inclination between the planar members;

wherein the planar members and the inner stringer each includes mortise means defining a channel for supporting the tread, at least one of the treads includes tenon means for insertion into the channel, and the fastening means includes bolt means for securing the tenon means in the channel.

2. The cabinet of claim 1 wherein the bolt means includes a bolt having a rectangular shaped head, and the mortise means includes keyway means in each of the planar members and the inner stringer for rotatably receiving the rectangular shaped head therein.

3. The cabinet of claim 2 wherein the planar members each comprise plywood, the rectangular head includes a beveled inner side, and the tenon means includes a shoulder area, the inner side compressing the plywood between the head and the shoulder area for avoiding splitting of the plywood when the head is rotated into the keyway means.

4. The cabinet of claim 3, wherein the keyway means includes a plurality of slots in each of the planar members and the inner stringer, each slot for receiving one of the heads when the corresponding bolt is rotated approximately 90° with respect to the tenon means.

5. The cabinet of claim 3 wherein the head includes locking means thereon for securing the bolt in the keyway means.

6. The cabinet of claim 7 wherein each tread includes an access channel corresponding to each bolt for rotating the bolts.

7. The cabinet of claim 6 wherein each bolt includes a thread thereon having a predetermined pitch, and the bolt head includes an enlarged inner thickness having a pitch greater than the predetermined pitch for exerting a pinching force between the head and the keyway means when the bolt is rotated in the keyway means in either direction.

8. The cabinet of claim 6 wherein the bolt includes a transverse hole in the end opposite to the head for alignment with the access channel to receive a toll for facilitating rotation of the bolt.

9. The cabinet of claim 1 also including a shelf removably fixed between the planar members for strengthening the cabinet.

10. The cabinet of claim 1 wherein the outer walls are substantially parallel to each other, the inner stringer is at a predetermined angle of inclination between the walls, and the cabinet includes a tensile rail between the walls for increasing the rigidity of the cabinet.

11. The cabinet of claim 1 also including a plurality of risers between the inner stringer and the outer stringer means, the risers being positioned at least between adjacent pairs of treads on the same side of the inner stringer; and the means for attaching the risers between the inner stringer and the outer stringer means in alternating arrangement on respective opposite sides of the inner stringer.

12. The cabinet of claim 1 wherein the planar members each comprise a wooden sheet having an outer surface, the fastening means passing only partially through the planar members for maintaining the outer surface unbroken by the fastening means.

13. The cabinet of claim 1 wherein the planar members each comprise plywood.

14. The cabinet of claim 13 wherein each planar member includes at lest two sheets of plywood, the sheets including male-female type joints for field-joining the sheets to form the planar member.

15. The cabinet of claim 1 wherein the outer stringer means includes a pair of planar members, each of the planar members simultaneously serving as an outside stringer, rail support, and wall of the cabinet.

16. The cabinet of claim 15 wherein each planar member is integrally formed of only a single plywood sheet.

17. The cabinet of claim 1 also including door means movably attached between the outer walls for enclosing the cabinet space.

18. The cabinet of claim 1 also including handrail member attached to each of the planar members for stiffening the planar member.

19. The cabinet of claim 1 wherein the fastening means includes removable fasteners for facilitating rapid kick-down and assembly of the cabinet.

20. The cabinet of claim 1 wherein the planar members each include a lower portion defining the cabinet space therebetween, and an upper extended portion defining an upper stair area therebetween and extending beyond the horizontal dimension of the lower portion of the planar members for reducing the space occupied by the cabinet.

21. A staircase cabinet comprising:
a plurality of treads, each having an outer edge, an inner edge and a back surface;
outer stringer means both for defining opposed walls of the cabinet and supporting the outer edges of each tread;
an inner stringer for supporting the inner edges of each tread;
fastening means for attaching the treads of the inner stringer and the outer stringer means in alternating arrangement on respective opposite sides of the inner stringer to define an alternating staircase of sue between a lower level and an upper level, the back surface of the treads and the outer stringer means defining a cabinet space;
a plurality of risers between the inner stringer and the outer stringer means, the risers being positioned t least between adjacent pairs of treads on the same side of the inner stringer; and
means for attaching the risers between the inner stringer and the outer stringer means in alternating arrangement on respective opposite sides of the inner stringer;
wherein the attaching means includes a groove in a facing surface of each of the adjacent treads, the risers having portions sized for insertion into the grooves for securing the risers.

22. The cabinet of claim 21 wherein the means for attaching also includes means for permitting movement of at lease one of the risers for allowing access to the cabinet space.

23. The cabinet of claim 21 also including flexible joint means for foldably attaching the risers to the treads in an accordion-like manner for facilitating shipment a nd assembly of the cabinet, the flexible joint means including at least one flexible fastener between each successive tread and riser on each side of the inner stringer.

24. A staircase cabinet, comprising:
   a plurality of treads, each having an outer edge, an inner edge, and a back surface;
   outer stringer means both for defining opposed walls of the cabinet and supporting the outer edges of each tread;
   an inner stringer for supporting the inner edges of each tread; and
   fastening means or attaching the treads to the inner stringer nd the outer stringer means in alternating arrangement on respective opposite sides of the inner stringer to define an alternating staircase of ruse between a lower level and an upper level, the back surface of the treads and the outer stringer means defining a cabinet space;
   the outer stringer means including a pair of opposed planar members, the inner stringer being disposed at a predetermined angle of inclination between the planer members;
   wherein the fastening means includes a male dovetail on the inner and outer edges of each tread, and the planar members and inner stinger each includes a plurality of truncated half female dovetails each for receiving one of the male dovetails therein, each female dovetail includes a lower portion longer than the corresponding male dovetail, the lower portion having a sloping side of hallowing insertion of the male dovetail; and
   a wedge member sized for insertion into the female dovetail along the sloping side for contacting and securing the male dovetail in the female dovetail.

* * * * *

UNITED STATES PATENT AND TRADEMARK OFFICE
CERTIFICATE OF CORRECTION

PATENT NO.  : 5,239,796
DATED       : August 31, 1993
INVENTOR(S) : Timothy J. MALONEY It is certified that error appears in the above-identified patent and that said Letters Patent is hereby corrected as shown below:

Claim 1, column 7, line 10, change "predetermine" to --predetermined--.

Claim 6, column 7, line 39, change "claim 7" to --claim 2--.

Claim 11, column 7, line 65, delete "the" (first occurrence) and start a new paragraph beginning with "means".

Claim 14, column 8, line 9, change "lest" to --least--.

Claim 21, column 8, lines 46 and 47, change "of sue" to --for use--; and
    column 8, line 51, change "t" to --at--.

Claim 22, column 8, line 64, change "lease" to --least--.

Claim 23, column 9, line 1, change "a nd" to --and--.

Claim 24, column 9, line 13, change "or" to --for--;
    column 9, line 14, change "nd" to --and--;
    column 9, lines 16 and 17, change "of ruse" to --for use--;
    column 10, line 6, change "planer" to --planar--;
    column 10, line 9, change "stinger" to --stringer--; and

UNITED STATES PATENT AND TRADEMARK OFFICE
CERTIFICATE OF CORRECTION

PATENT NO.   : 5,239,796
DATED        : August 31, 1993
INVENTOR(S)  : Timothy J. MALONEY It is certified that error appears in the above-indentified patent and that said Letters Patent is hereby corrected as shown below:

column 10, line 14, change "of hallowing" to --for allowing--.

Signed and Sealed this

Twenty-ninth Day of March, 1994

Attest:

BRUCE LEHMAN

*Attesting Officer*     *Commissioner of Patents and Trademarks*